United States Patent
Beckman

(10) Patent No.: US 6,168,204 B1
(45) Date of Patent: Jan. 2, 2001

(54) VEHICLE FRAME ASSEMBLY HAVING INTEGRAL SUPPORT SURFACES

(75) Inventor: John A. Beckman, Wernersville, PA (US)

(73) Assignee: Dana Corporation, Toledo, OH (US)

( * ) Notice: Under 35 U.S.C. 154(b), the term of this patent shall be extended for 0 days.

(21) Appl. No.: 09/268,443

(22) Filed: Mar. 12, 1999

(Under 37 CFR 1.47)

(51) Int. Cl.⁷ .................................................. B62D 21/02
(52) U.S. Cl. .......................... 280/797; 280/781; 180/312; 296/204; 29/897.2
(58) Field of Search .................................. 280/797, 798, 280/781, 796, 800; 180/311, 312; 296/204, 205; 29/897.2, 897.35

(56) References Cited

U.S. PATENT DOCUMENTS

| | | |
|---|---|---|
| 2,107,382 | 2/1938 | Maddock . |
| 2,840,388 * | 6/1958 | Burrows ................................ 280/797 |
| 2,901,266 * | 8/1959 | Lindsay .................................. 280/797 |
| 3,188,110 | 6/1965 | Wessells, III . |
| 3,509,679 | 5/1970 | Lindquist . |
| 5,093,990 | 3/1992 | Klippel . |
| 5,561,902 | 10/1996 | Jacobs et al. . |

FOREIGN PATENT DOCUMENTS 5-254459 * 10/1993 (JP) ...................................... 280/781

* cited by examiner

Primary Examiner—Peter English
(74) Attorney, Agent, or Firm—MacMillan, Sobanski & Todd, LLC

(57) ABSTRACT

A vehicular body and frame assembly includes a pair of side rails, wherein one or both of the side rails has an integral support surface formed therein to facilitate the mounting of various components on the vehicle frame assembly. Each of the side rails is formed from a closed channel structural member having a desired cross sectional shape. A portion of each side rail is further formed having a cross sectional shape that is substantially similar to, but rotationally offset from, the cross sectional shape of the remainder of the side rail. The transitions from the side rails to the rotationally offset portions and from the rotationally offset portions back to the side rails are preferably smooth and continuous. The rotationally offset portions may extend throughout any desired portion or portions of the side rails, and may further vary in the amount of rotational offset if desired. Thus, the rotationally offset portions of the side rails can be oriented in such a manner as to provide cradle-like support surfaces for a component to be mounted on the vehicle frame assembly, such as a portion of an engine or transmission.

8 Claims, 3 Drawing Sheets

VEHICLE FRAME ASSEMBLY HAVING INTEGRAL SUPPORT SURFACES

BACKGROUND OF THE INVENTION

This invention relates in general to body and frame assemblies for vehicles. More specifically, this invention relates to an improved structure for a vehicular body and frame assembly including a pair of side rails, wherein one or both of the side rails has at least one integral support surface formed therein to facilitate the mounting of various components on the vehicle frame assembly.

Many land vehicles in common use, such as automobiles, vans, and trucks, include a body and frame assembly that is supported upon a plurality of groundengaging engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit which is resiliently supported upon the vehicle wheels by the suspension system. Unitized body and frame assemblies of this general type are found in many relatively small modem vehicles, such as automobiles and minivans.

One well known example of a separate type of vehicular body and frame assembly is commonly referred to as a ladder frame assembly. A ladder frame assembly includes a pair of longitudinally extending side rails that are joined together by a plurality of transversely extending cross members. The cross members connect the two side rails together and provide desirable lateral, vertical, and torsional stiffness to the ladder frame assembly. The cross members can also be used to provide support for various components of the vehicle. Depending upon the overall length of the vehicle and other factors, the side rails of a conventional ladder frame assembly may be formed either from a single, relatively long structural member or from a plurality of individual, relatively short structural members that are secured together. For example, in vehicles having a relatively short overall length, it is known to form each of the side rails from a single integral structural member that extends the entire length of the vehicle body and frame assembly. In vehicles having a relatively long overall length, it is known to form each of the side rails from two or more individual structural members that are secured together, such as by welding, to provide a unitary structural member that extends the entire length of the vehicle body and frame assembly.

Traditionally, the side rails of known vehicle body and frame assemblies have been formed exclusively from open channel structural members, i.e., structural members that have a non-continuous cross sectional shape (U-shaped or C-shaped channel members, for example). Thus, it is known to use a single integral open channel structural member to form a side rail that extends the entire length of the vehicle body and frame assembly, as described above. Additionally, it is known to secure a plurality of such open channel structural members together to form the individual sections of a unitary side rail for a vehicle body and frame assembly, as also described above. However, the use of open channel structural members to form the side rails and cross members for vehicle body and frame assemblies has been found to be undesirable for several reasons. First, it is relatively time consuming and expensive to bend multiple portions of the side rails to conform to a desired final shape, as is commonly necessary. Second, after such bending has been performed, a relatively large number of brackets or other mounting devices must usually be secured to each of the side rails to facilitate the attachment of the various components of the vehicle to the body and frame assembly. Third, in those instances where the side rails are formed from a plurality of individual sections, it has been found difficult to maintain dimensional stability throughout the length of the side rail when the individual side rail sections are secured together.

More recently, it has been proposed to form the side rails and the cross embers from closed channel structural members, i.e., structural members that have a continuous cross sectional shape (tubular or box-shaped channel members, for example). In vehicle body and frame assemblies of this type, it is known that the closed channel structural member may be deformed to a desired shape by hydroforming. Hydroforming is a well known process that uses pressurized fluid to deform a closed channel structural member into a desired shape. To accomplish this, the closed channel structural member is initially disposed between two die sections of a hydroforming apparatus that, when closed together, define a die cavity having a desired final shape. Thereafter, the closed channel structural member is filled with a pressurized fluid, typically a relatively incompressible liquid such as water. The pressure of the fluid is increased to a magnitude where the closed channel structural member is expanded or otherwise deformed outwardly into conformance with the die cavity. As a result, the closed channel structural member is deformed into the desired final shape.

Hydroforming has been found to be a desirable forming process because portions of a closed channel structural member can be quickly and easily deformed to have a complex cross sectional shape. Additionally, hydroforming can be used to form appropriately shaped surfaces on the side rails to facilitate the mounting of various components directly on the vehicle frame assembly, without the use (or with minimal use) of separate brackets or other mounting devices. However, in known hydroforming methods that form integral mounting surfaces in the side rails, not only is the cross sectional shape of the closed channel structural member changed during the hydroforming process, but the wall thickness thereof is decreased. This decrease in wall thickness is caused when the perimeter of the closed channel structural member is expanded during the hydroforming process. Such wall thickness variations are usually considered to be undesirable because they can result in weaknesses in certain portions of the formed closed channel structural member.

One solution to this problem is to increase the wall thickness of the entire closed channel structural member such that the most extreme reductions in the wall thickness thereof would not adversely affect the overall strength of the member for its intended use. However, such over-designing undesirably increases the overall weight and cost of the closed channel structural member and the resultant vehicle frame component. An alternative solution is to employ a process known as end feeding. End feeding involves applying a mechanical force against one or both end portions of the closed channel structural member simultaneously as the interior portion is expanded. As a result, some of the metallic material of the end portions flows into the interior portion being expanded, thus minimizing the reduction in the wall thickness thereof. End feeding has been found to function satisfactorily in many instances, but is somewhat limited in its ability to cause the metallic material of the end portions of the closed channel structural member to flow into the expanded interior portion. Thus, it would be desirable to provide an improved structure for a component for a vehicular body and frame assembly, such as a side rail, having integral support surface wherein the perimeter of the component is not significantly changed during the formation thereof.

SUMMARY OF THE INVENTION

This invention relates an improved structure for a vehicular body and frame assembly including a pair of side rails, wherein one or both of the side rails has an integral support surface formed therein to facilitate the mounting of various components on the vehicle frame assembly. Each of the side rails is formed from a closed channel structural member having a desired cross sectional shape. A portion of each side rail is further formed having a cross sectional shape that is substantially similar to, but rotationally offset from, the cross sectional shape of the remainder of the side rail. The transitions from the side rails to the rotationally offset portions and from the rotationally offset portions back to the side rails are preferably smooth and continuous. The rotationally offset portions may extend throughout any desired portion or portions of the side rails, and may further vary in the amount of rotational offset if desired. Thus, the rotationally offset portions of the side rails can be oriented in such a manner as to provide cradle-like support surfaces for a component to be mounted on the vehicle frame assembly, such as a portion of an engine or transmission.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
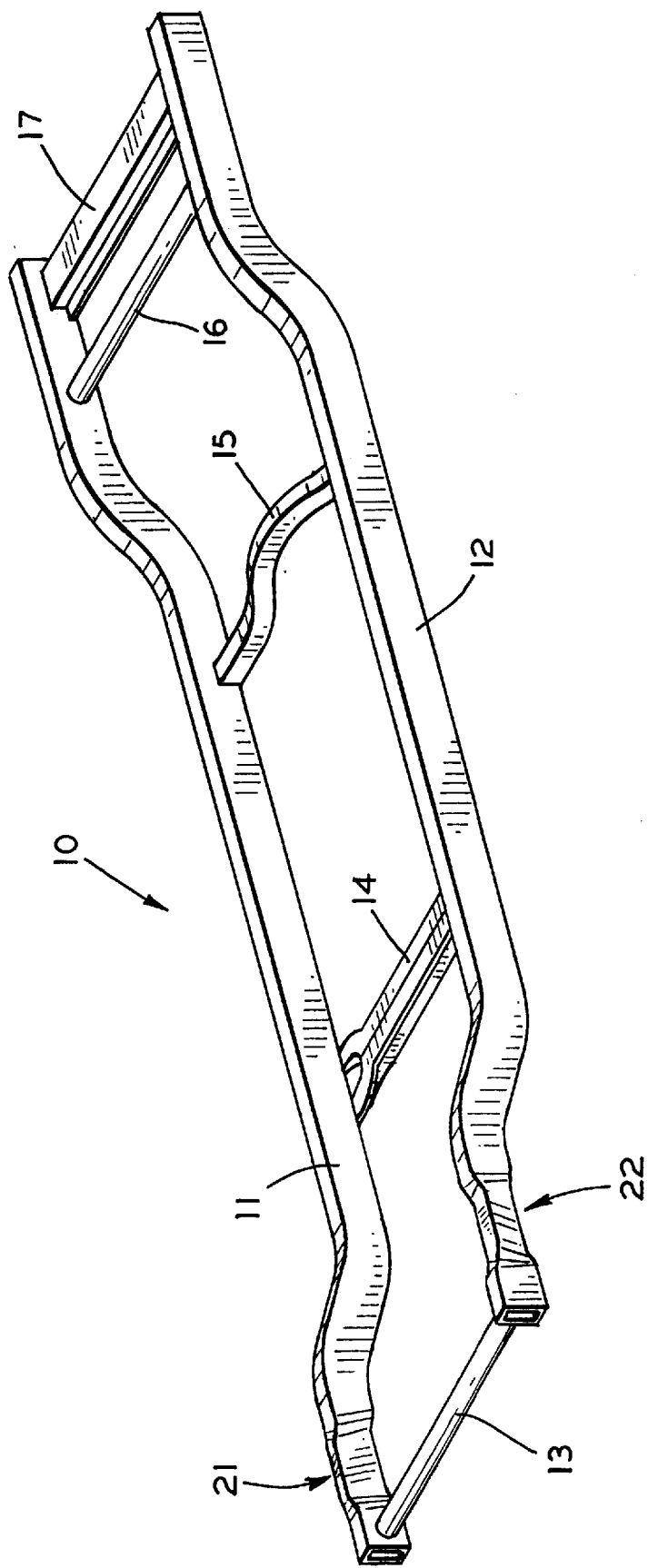
FIG. 1 is a perspective view of a vehicle frame assembly including a pair of side rails in accordance with this invention.

Referring now to the drawings, there is illustrated in FIG. 1, a vehicle frame assembly, indicated generally at 10, in accordance with this invention. The illustrated vehicle frame assembly 10 is a ladder frame assembly including a pair of longitudinally extending side rails 11 and 12 having a plurality of transverse cross members 13, 14, 15, 16, and 17 extending therebetween. The side rails 11 and 12 extend longitudinally throughout the entire length of the assembly 10 and are generally parallel to one another. Each of the side rails 11 and 12 in the illustrated embodiment is formed from a single closed channel structural member. However, it will be appreciated that one or both of the side rails 11 and 12 may be formed from a plurality of individually formed closed channel structural members that are secured together by any conventional means, such as by welding, riveting, bolting, and the like. Furthermore, portions of the side rails 11 and 12 may be formed from open channel structural members if desired.

The cross members 13 through 17 extend generally perpendicular to the side rails 11 and 12 and may be formed having any conventional structure. The cross members 13 through 17 are spaced apart from one another along the length of the ladder frame assembly 10 and can be secured to the side rails 11 and 12 by any conventional means, such as by welding, riveting, bolting, and the like. When secured to the side rails 11 and 12, the cross members 13 through 17 provide lateral and torsional rigidity to the ladder frame assembly 10.

Figure 2:
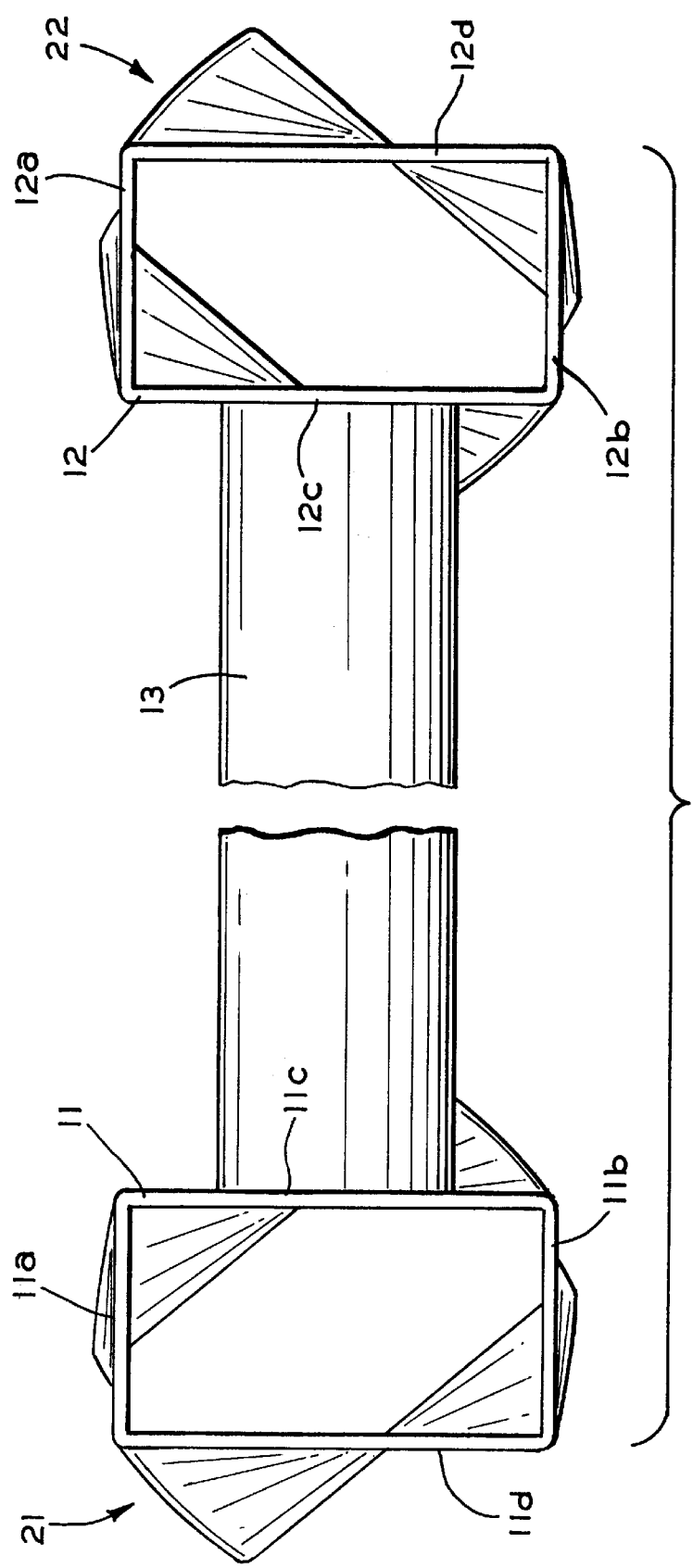
FIG. 2 is an elevational view of the front portion of the vehicle frame assembly illustrated in FIG. 1.
Figure 3:
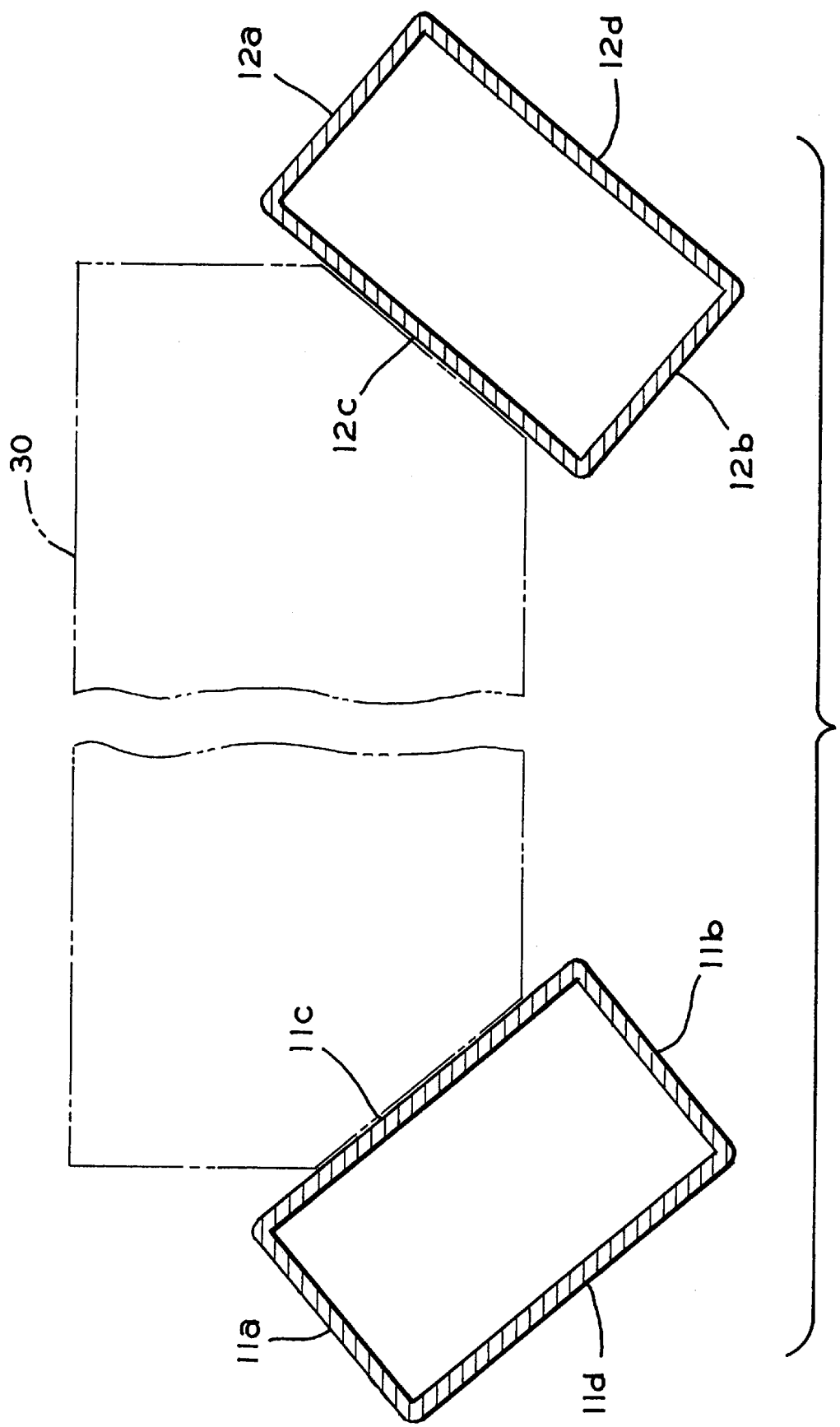
FIG. 3 is a sectional elevational view of a portion of the vehicle frame assembly illustrated in FIG. 2 schematically illustrating a component mounted thereon.

In the illustrated embodiment, each of the side rails 11 is formed having a generally hollow rectangular cross sectional shape throughout most of the length thereof. Thus, as best shown in FIGS. 2 and 3, the first side rail 11 has an upper end 11a, a lower end 11b, an inner side 11c, and an outer side 11d. Similarly, the second side rail 12 has an upper end 12a, a lower end 12b, an inner side 12c, and an outer side 12d. Throughout most of the length of the side rails 11 and 12, the upper ends 11a, 12a and the lower ends 11b, 12b extend generally parallel with one another. Similarly, the inner sides 11c, 12c and the outer sides 11d, 12d of the side rails 11 and 12 extend generally parallel with one another throughout most of the length thereof. Although this invention will be described in the context of the illustrated hollow rectangular cross sectional shape, it will be appreciated that the side rail 11 may be formed having any desired cross sectional shape, such as square, triangular, and the like.

A portion, indicated generally at 21, of the first side rail 11 is formed having a cross sectional shape that is substantially similar to, but rotationally offset from, the cross sectional shape of the remainder of the first side rail 11. Similarly, a portion, indicated generally at 22, of the second side rail 12 is formed having a cross sectional shape that is substantially similar to, but rotationally offset from, the cross sectional shape of the remainder of the second side rail 12. Thus, as best shown in FIGS. 2 and 3, the portions 21 and 22 of the side rails 11 and 12, respectively, have generally hollow rectangular cross sectional shapes that are rotationally offset from the remainders of the side rails 11 and 12. As a result, the upper ends 11a, 12a and the lower ends 11b, 12b of the portions 21 and 22 of the side rails 11 and 12, respectively, do not extend generally parallel with one another, but rather are oriented at angles relative to one another. Similarly, the inner sides 11c, 12c and the outer sides 11d, 12d of the portions 21 and 22 of the side rails 11 and 12 do not extend generally parallel with one another, but rather are also oriented at angles relative to one another.

Thus, as best shown in FIG. 3, the inner sides 11c and 12c of the side rails 11 and 12, respectively, are oriented in such a manner as to provide cradle-like support surfaces for a vehicular component, indicated in dotted lines at 30, to be mounted on the vehicle frame assembly 10, such as a portion of an engine or transmission. The angled inner sides 11c and 12c of the side rails 11 and 12, respectively, can be formed in any desired orientation to facilitate the supporting and mounting of the component thereon. Any conventional means, such as threaded fasteners and the like, may be used to secure the component 30 to the portions 21 and 22 of the side rails 11 and 12, respectively. It will be appreciated that the specific angular orientation of the inner sides 11c and 12c of the side rails 11 and 12, respectively, may be varied as desired.

In the illustrated embodiment, the rotationally offset portions 21 and 22 are relatively short in comparison to the overall lengths of the side rails 11 and 12. However, the rotationally offset portions 21 and 22 may extend throughout any desired lengths of either or both of the side rails 11 and 12. Furthermore, a plurality of such portions 21 and 22 may be formed on either or both of the side rails 11 and 12. Also, the amount of the rotational offset may vary within some or all of the portions 21 and 22 of the side rails 11 and 12 if desired. As shown in the drawings, the transitions from the side rails 11, 12 to the rotationally offset portions 21, 22 and from the rotationally offset portions 21, 22 back to the side rails 11, 12 are preferably smooth and continuous.

The side rails 11 and 12 may be formed to the illustrated shape by hydroforming. As mentioned above, hydroforming is a well known process that uses pressurized fluid to deform a closed channel structural member into a desired shape. Hydroforming has been found to be a desirable forming process because the rotationally offset portions 21 and 22 of the side rails 11 and 12, as well as other appropriately shaped surfaces, can be quickly and easily deformed as desired. The formation of the rotationally offset portions 21 and 22 as described above to provide mounting surfaces for the component 30 is desirable because the perimeter of the side rails 11 and 12 is maintained substantially constant throughout the length thereof. This tends to maintain the wall thicknesses of the side rails 11 and 12 relatively constant when the rotationally offset portions 21 and 22 are formed, thus preventing the creation of relatively weak spots. As mentioned above, in known hydroforming methods that form integral mounting surfaces in the side rails, not only is the cross sectional shape of the closed channel structural member changed during the hydroforming process, but the wall thickness thereof is decreased. Such wall thickness variations are usually considered to be undesirable because they can result in weaknesses in portions of the formed closed channel structural member. Although hydroforming is the preferred method of manufacturing the side rails 11 and 12, it may be possible to form such side rails 11 and 12 by mechanically twisting straight stock into the illustrated shapes or by other methods.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle frame assembly comprising:

first and second side rails, said first side rail being formed from a closed channel structural member having a first portion defining a first cross sectional shape and a second portion defining a second cross sectional shape that is substantially similar to, but rotationally offset from, said first cross sectional shape; and a plurality of cross members extending between and connected to said first and second side rails.

2. The vehicle frame assembly defined in claim 1 wherein said first and second cross sectional shapes of said first side rail are generally rectangular.

3. The vehicle frame assembly defined in claim 1 further including a component secured to said second portion of said first side rail.

4. The vehicle frame assembly defined in claim 1 wherein said first side rail further includes a transition portion that is substantially smooth and continuous between said first portion and said second portion.

5. The vehicle frame assembly defined in claim 1 wherein said second side rail is formed from a closed channel structural member having a first portion defining a first cross sectional shape and a second portion defining a second cross sectional shape that is substantially similar to, but rotationally offset from, said first cross sectional shape.

6. The vehicle frame assembly defined in claim 5 wherein said first and second cross sectional shapes of said first side rail are generally rectangular, and wherein said first and second cross sectional shapes of said second side rail are generally rectangular.

7. The vehicle frame assembly defined in claim 5 further including a component secured to said second portion of said first side rail and to said second portion of said second side rail.

8. The vehicle frame assembly defined in claim 5 wherein said first side rail further includes a transition portion that is substantially smooth and continuous between said first portion and said second portion, and wherein said second side rail further includes a transition portion that is substantially smooth and continuous between said first portion and said second portion.

* * * * *